(12) United States Patent
Gwilt et al.

(10) Patent No.: US 9,225,938 B2
(45) Date of Patent: Dec. 29, 2015

(54) VIDEO CONFERENCING SYSTEMS

(75) Inventors: David John Gwilt, Royston (GB); Alexander Edward Nancekievill, Royston (GB)

(73) Assignee: Starleaf LTD, London (GB)

( * ) Notice: Subject to any disclaimer, the term of this patent is extended or adjusted under 35 U.S.C. 154(b) by 19 days.

(21) Appl. No.: 14/126,802

(22) PCT Filed: Jun. 6, 2012

(86) PCT No.: PCT/GB2012/051262
§ 371 (c)(1),
(2), (4) Date: Dec. 16, 2013

(87) PCT Pub. No.: WO2012/172310
PCT Pub. Date: Dec. 20, 2012

(65) Prior Publication Data
US 2014/0118469 A1    May 1, 2014

(30) Foreign Application Priority Data

Jun. 16, 2011  (GB) .................................. 1110119.3
Jun. 16, 2011  (GB) .................................. 1110122.7

(51) Int. Cl.
*H04N 7/15* (2006.01)
*H04M 7/00* (2006.01)
(Continued)

(52) U.S. Cl.
CPC ................. *H04N 7/15* (2013.01); *H04M 3/567* (2013.01); *H04M 3/568* (2013.01);
(Continued)

(58) Field of Classification Search
CPC ....... H04N 7/15; H04N 7/147; H04M 7/0027; H04M 3/568
USPC ............... 348/14.08; 370/260, 261, 265, 389, 370/217, 338, 392; 379/202.01; 455/416, 455/406, 432.3; 709/204, 229, 228; 726/7
See application file for complete search history.

(56) References Cited

U.S. PATENT DOCUMENTS 5,844,600 A * 12/1998 Kerr ............................ 348/14.12
6,125,115 A *  9/2000 Smits ............................ 370/389
(Continued)

FOREIGN PATENT DOCUMENTS

EP      1 324 608 A2    7/2003
WO   WO 03/034692 A2   4/2003

OTHER PUBLICATIONS

International Search Report for corresponding PCT/GB2012/051262, completed Oct. 24, 2012 by Suphi Umut Naci of the EPO.
(Continued)

*Primary Examiner* — Gerald Gauthier
(74) *Attorney, Agent, or Firm* — Tarolli, Sundheim, Covell & Tummino LLP (57) ABSTRACT

We describe a system for automatic setup of an audio/computer teleconference. The system comprises node units each having a phone connection, a telephone network connection, at least one computer network connection; and a system control server. The node unit comprises code to: transmit an outgoing audio announce message into a potential conference call via said telephone network audio connection, identifying the node unit; receive via the network audio connection an incoming audio announce message from a conference call to which the node unit is already connected; determine from the incoming message, an identifier for a remote node unit connecting to the conference call; and transmit to the server, via the computer network, identifiers for the local and remote node units. The server comprises code to: receive the node unit identifiers and provide computer equipment connection data to computer equipment at node.

17 Claims, 7 Drawing Sheets

(51) Int. Cl.
*H04N 7/14* (2006.01)
*H04M 3/56* (2006.01)

(52) U.S. Cl.
CPC ......... *H04M 7/0027* (2013.01); *H04M 7/0039* (2013.01); *H04N 7/147* (2013.01); *H04M 2201/22* (2013.01); *H04M 2201/50* (2013.01)

(56) References Cited

U.S. PATENT DOCUMENTS

| | | | | |
|---|---|---|---|---|
| 6,704,294 | B1 * | 3/2004 | Cruickshank | 370/265 |
| 6,816,468 | B1 * | 11/2004 | Cruickshank | 370/260 |
| 6,831,675 | B2 * | 12/2004 | Shachar et al. | 348/14.08 |
| 7,254,109 | B2 * | 8/2007 | Verma et al. | 370/217 |
| 7,277,697 | B2 * | 10/2007 | Desai et al. | 455/416 |
| 7,580,374 | B1 * | 8/2009 | Gilbert | 370/260 |
| 7,933,272 | B2 * | 4/2011 | Morris | 370/392 |
| 8,045,532 | B2 * | 10/2011 | Thomson et al. | 370/338 |
| 8,204,196 | B2 * | 6/2012 | O'Sullivan et al. | 379/202.01 |
| 8,296,448 | B2 * | 10/2012 | Ait-Ameur et al. | 709/228 |
| 8,805,361 | B2 * | 8/2014 | Kieselmann et al. | 455/432.3 |
| 8,825,004 | B2 * | 9/2014 | Hellgren | 455/406 |
| 2001/0056466 | A1 * | 12/2001 | Thompson et al. | 709/204 |
| 2003/0088619 | A1 * | 5/2003 | Boundy | 709/204 |
| 2004/0239754 | A1 | 12/2004 | Shachar et al. | |
| 2008/0101575 | A1 * | 5/2008 | Amador et al. | 379/202.01 |
| 2008/0144537 | A1 * | 6/2008 | Vadhri | 370/261 |
| 2010/0070640 | A1 * | 3/2010 | Allen et al. | 709/229 |
| 2010/0235894 | A1 * | 9/2010 | Allen et al. | 726/7 |
| 2014/0118469 | A1 * | 5/2014 | Gwilt et al. | 348/14.08 |

OTHER PUBLICATIONS

GB Search Report for corresponding British Patent Application No. GB1110119.3, dated Oct. 6, 2011.

* cited by examiner

VIDEO CONFERENCING SYSTEMS

RELATED APPLICATIONS

The present invention claims priority from PCT/GB2012/051262, filed 6 Jun. 2012, which claims priority from GB11101193, filed on 16 Jun. 2011 and GB1110122.7 filed on 16 Jun. 2011, all of which are herein incorporated by reference in their entirety.

FIELD OF THE INVENTION

One aspect of the invention relates to systems, methods and computer program code for automatic connection of computer equipment between participants in a hosted teleconference. In another aspect, embodiments of the techniques we describe are particularly useful for achieving lip-sync in a video conferencing system.

BACKGROUND TO THE INVENTION

Use of video conferencing equipment is common place, but improvements in the ease of use of such equipment are still desirable.

Background prior art can be found in U.S. Pat. No. 4,560,883, U.S. Pat. No. 7,432,951, and in IEEE Paper: "A media synchronization survey: reference model, specification, and case studies", Blakowski and Stienmetz, 1996; Report IS-191 of the Advanced Television Systems Committee; and in "Voice and Video Conferencing Fundamentals," from Cisco Press; as well as EP1,324,608A and WO03/034692.

We will describe techniques which improve on the prior art and facilitate automatically establishing a video conference call or similar digital shared connection.

Lip-Sync

Any system that involves the transmission and reception of both video and audio is potentially vulnerable to the 'lip-sync' problem. This is the common name for the situation where users perceive a difference between the time they hear a sound, and the time they see an image associated with that sound. A study by Blakowski and Stienmetz showed that humans are very sensitive to this time difference, and particularly so if audio arrives ahead of video. As a result the Advanced Television Systems Committee recommends in report IS-191 that broadcast television systems should not permit a difference of more than 45 ms if audio leads video, and 75 ms if video leads audio.

Differences in time occur because the audio and video take different paths from sender to receiver. If delays in each stage of each of these paths are fixed, then correction is relatively simple and only involves applying a further fixed delay to the faster path to bring them into synchronisation. An example of this form of correction is provided in many modern home cinema amplifiers which can apply a user controlled fixed delay to correct poor lip sync between video displayed on a television and audio played back through the amplifier.

However in video conferencing systems the problem is more complex because many of the delays are not fixed, but vary over time. A good explanation of the prior art solution to this problem is given in 'Voice and Video conferencing Fundamentals' published by Cisco™ press. In summary, prior art video conferencing systems attach a timestamp to each frame of audio samples, and another to each video frame in the transmitter. These timestamps are used in the receiver to calculate the time difference between the two channels and then to correct it on a frame by frame basis.

The prior art approach works well, but it can only be used if it is possible to add timestamps to both audio and video channels. However in our new video conferencing system (see also our co-pending patent application filed on the same day as the application), video is added to a pre-existing ordinary telephone call. This new approach provides a number of benefits over previous approaches. The audio part of the call retains the simplicity, familiarity and reliability of an ordinary phone call. The video is an enhancement, but it does not get in the way of placing or conducting a phone call. Users do not have to replace existing conference phones or use a different microphone for video conferences versus audio conferences. For conference calls, it becomes very easy to mix some participants with audio-only and others who have audio and video. Moreover, if the IP network used by the video channel is heavily congested and video quality is affected, communication can continue uninterrupted as audio-only. Unfortunately using the conventional telephone network for the audio channel of a video conference makes lip-sync much harder to achieve. It is no longer practical to use the prior art technique of adding timestamps to both channels because the POTS (Plain Old Telephone System) telephone network is extremely bandwidth limited and will only reliably carry signals within the range of human hearing. Thus adding time stamps to the audio channel would substantially interfere with the audio portion of the teleconference, which is undesirable. One approach to this problem is described in US2006/0291478.

We will describe techniques suitable for use with embodiments of our new video conferencing system which enable synchronisation of audio and a digital data stream, for example a video data stream, in embodiments without interfering with or modifying the telephone audio in any way.

SUMMARY OF THE INVENTION

According to a first aspect of the invention there is therefore provided a system for automatic connection of computer equipment between participants in an audio teleconference, the system comprising: at least two node units, each said node unit having a phone audio connection to provide an audio interface with a phone, a telephone network audio connection to provide an audio interface with a phone network, and at least one computer interface for interfacing with computer equipment and a computer network, the at least one computer interface comprising at least one computer network connection; and a system control server having an interface to said computer network; wherein a said node unit comprises node processor control code to: transmit an outgoing audio announce message into a potential conference call via said telephone network audio connection, wherein said outgoing audio announce message identifies said node unit connecting to said potential conference call; receive via said telephone network audio connection an incoming said audio announce message from a conference call to which the node unit is already connected; determine, from said incoming audio announce message, an identifier identifying a remote node unit connecting to said conference call; and transmit, via said computer network to said system control server, responsive to said received message, both an identifier for said node unit and said identifier for said remote node unit; and wherein said system control server comprises server processor control code to: receive said identifiers for said node unit and for said remote node unit; and provide computer equipment connection data to respective computer equipment for each of said identified node unit and said identified remote node unit, to enable connection between said respective computer equipment of said node units.

Embodiments of the system enable automatic establishment of a video conference call over an IP (internet protocol) computer network, automatically detecting establishment of the audio conference call set up and then setting up the corresponding video call between the computer equipment connected to the respective nodes, where possible. In this way the audio conference call happens over the (audio) phone network in the usual way and the video call is established over the (separate) IP network, using the audio telephone network to set up the video 'call'. The set up of the video call happens automatically and transparently to the user, the node units in combination with the system control server providing the audio signalling over the audio telephone network which enables the digital 'switching' to set up the video call. The skilled person will appreciate that embodiments of these techniques are not dependent on a particular type of phone/phone network and will, for example, work with both a POTS (Plain Old Telephone System) network and a voice over Internet Protocol (VOIP) phone/network. The teleconference may have just two nodes, that is it may be a point-to-point call, or may have more than two connected nodes.

The skilled person will appreciate that although preferred embodiments of the system implement a video call, the techniques we describe may also be employed with other forms of streamed media shared over a digital network between computer equipment coupled to the node units and, more generally, other forms of digital data sharing or "digital call", for example desktop sharing and the like.

In embodiments a node unit includes code to detect connection of the unit to a potential conference call. The outgoing audio announce message is transmitted following such potential connection detection. More particularly in embodiments the node sends a connection detection message to the server identifying detection of the potential conference call and receives a response to this message from the server for use in transmission of the outgoing audio announce message. This message may comprise a simple confirmation that the call is a potential video call, and/or it may comprise data for the audio announce message.

Thus broadly speaking, in embodiments a node unit announces connection of the phone to which is connected into a potential conference call, by sending an audio message, for example a tone, tone combination or tone sequence. A node unit also detects such audio messages sent from one or more other node units connected to a conference call, the audio messages being sent over the telephone network. However in embodiments, whilst an incoming audio announce message does identify a remote node, it does not identify it to the local node—instead the local node passes it on and the system control server does the identification. In a similar way, in embodiments the transmitted identifier for a node unit identifies the node unit to the server. In embodiments a node receiving an incoming audio announce message decodes the node identification data and sends this on to the server via the computer network, but the local does not (need to) know which remote node the message came from: in embodiments the directory information is held in the server.

When a node unit already on a conference call detects another node unit (phone) joining, it then sends to the system control server information which tells the server that the two identified node units are on a shared audio call. The server then enables set-up of a digital connection between the computer equipment connected to the respective node units, for example by providing connection data to the connected computer equipment, in embodiments via the node units, so that they can set up the digital connection. In embodiments the connection data comprises sharing identifier data for connecting the computer equipment of each respective node unit to a digital media sharing service. For example the sharing identifier data may comprise a Webex™ internet address. The respective node units may receive the same or complimentary sharing identified data to enable set up of the digital connection. In embodiments the computer equipment is connected to the computer (IP) network via the node units and the node units manage the forwarding of the sharing identifier data to the respective computer equipment. However, potentially, the computer equipment associated with each node unit may have a separate connection to the computer network and set up of the digital call may nonetheless be managed by the system control server by passing connect messages over the computer network.

In embodiments, three or more node units may each be connected into a pair of audio and digital conference calls which are separate in the sense that they operate over separate audio (analogue or VOIP) and digital (computer) networks but which are synchronised so as to give the impression to a user of a single combined audio and digital conference call, giving the impression that the call is operating seamlessly over a single network.

In some preferred embodiments, for security, when a node detects connection to a potential conference call it connects to the server and receives a temporary identifier which is used in place of the identifier it uses initially to connect to the server (and, optionally, this initial connection may be secure). In this way each node unit may be allocated a temporary identifier, similar to a one time password, which may be employed to conceal the true identities of the node units connecting to the conference call, to restrict the possibility of an eavesdropping attack on the digital call. Scope for such attack is nonetheless limited because of the separate use of the telephone network for signalling to set up the digital call.

In embodiments, therefore, a node comprises code to request and receive from the server a temporary identifier, for example a random, unique-in-time value, and this in encoded into the outgoing audio announce message. When another node unit receives this message and decodes the code this temporary identifier may be linked with the receiving nodes identifier and the two together passed to the control server, which is then able to identify the true identities of the two nodes since the control server maintains a table or other relationship linking the temporary and permanent or true node identities. In embodiments the messages passed between a node and the server include an IP address of the node and an encrypted identifier of the node.

As an alternative to use of a temporary identifier, a transformation or encryption of the node's identifier may be employed and encoded/decoded into/from the audio messages. In general a node unit will store such a unique identifier internally in non-volatile memory. The transformation may be implemented, using, for example, a look up table or a hash function. Where transformation or encryption of a true node identifier is employed, this may be lossless to reduce or avoid address conflicts.

The code in a node may treat any dialled number as a potential conference call but in some preferred embodiments to reduce the server load a node is configured to apply a first pass filter to screen out calls which are determined not to be conference calls. Such a filter may be based on one or more of whether or not the dialled number is an internal extension. The country code of the dialled number, the area code and so forth. For example, it is common to dial '9' for an outside line and a node may be programmed to filter out calls not beginning with a specified digit or digits. Similarly in the UK an audio conference bridge number typically begins '0845' and thus a node may be programmed to select as potential conference calls only those having a specified set of digits or one of a plurality of specified sets of digits. Additionally or alternatively the server may perform similar screening. Thus in embodiments the system includes code to monitor the telephone network audio connection to identify a phone number (which may include a PIN) dialled by a phone connected to the node unit. However it will be appreciated that it is not essential to be able to detect whether or not a number is a conference all as (preferably after filtering) all calls may be treated as potential conference calls so that later joining nodes may be connected.

It will appreciated that, in embodiments, an existing caller on an audio conference call will hear the audio announce message of a new caller joining the call, the node of the existing caller also 'hearing' this to determine that a new caller has joined. In embodiments a node includes code to detect and resolve a conflict between audio announce messages, for example by randomly backing off transmission of an outgoing audio announce message.

In embodiments where the digital connection comprises a streamed video connection, preferably the system, more particularly a node, includes code to synchronise the audio and video carried over the two separate networks, for example by controlling delay of the audio data between the phone network and phone.

Related aspects of the invention provide, independently, a node unit and a system control server as described above, and corresponding processor control code.

In preferred embodiments the server is configured to store data linking or mapping an outgoing audio announce message as described above to the node unit transmitting the audio announce message. This may be achieved, for example, by the server sending data for inclusion the audio announce message to the node in the first place, or the node may employ an announce message comprising data that is permanently unique to the node, thus allowing the node transmitting the message to be identified.

In a related aspect the invention provides a method of automatic connection of computer equipment between participants in an audio teleconference in a system comprising: at least two node units, each said node unit having a phone audio connection to provide an audio interface with a phone, a telephone network audio connection to provide an audio interface with a phone network, and at least one computer interface for interfacing with computer equipment and a computer network, the at least one computer interface comprising at least one computer network connection; and a system control server having an interface to said computer network; the method comprising: setting up an audio conference call over said phone network via said node units; intercepting said audio conference call setup in said node units; and setting up a digital streamed media conference call between computer equipment at said respective node units, responsive to said intercepting of said audio conference call setup, wherein said streamed media conference call operates over said computer network; the method further comprising: using audio signalling over said phone network for said setting up of said digital streamed media conference call.

In some preferred embodiments the method further comprises using the audio signalling to announce that a second or subsequent phone has joined the audio conference call, detecting this, via the audio telephone network, at a first phone and then reporting, from a load associated with the first phone, that the first and second phones are on a shared audio conference call so that the system control server can set up a corresponding digital link between the computer equipment associated with the respective nodes.

Thus in embodiments audio signalling over the phone network comprises sending an audio signal for setting up the digital streamed media conference call from a node unit over the phone network, and receiving a response to the audio signal at the node via the computer network. Although the node unit may hear an audio signal from another node unit it does not listen to or act on this signalling, but instead uses the computer network as a return signal path to receive a call setup signal, bearing call setup data, from the server: Whilst a node can receive the incoming announce message, it does not have a concept of who it came from; in preferred embodiments the directory information is held in the server.

The invention further provides processor control code to implement the above-described systems, devices and methods, for example on a general purpose computer system or on a digital signal processor (DSP). The code is provided on a physical carrier such as a disc, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

Lip-Sync

According to a further aspect of the invention there is therefore provided a method of synchronising a teleconference comprising audio carried on a telephone network and a digital data stream carried on a computer network, the method comprising: inputting first audio for said teleconference at a first node of a teleconference system; processing said first audio to determine first audio characterising data characterising said first audio; providing said first audio to a telephone network providing an audio teleconference; inputting at said first node a first digital data stream for said teleconference; inserting said first audio characterising data into said first digital data stream; forwarding said first digital data stream over said computer network; receiving said first audio at a second node of said teleconference system coupled to said telephone network, wherein said second node is a participant in said audio teleconference; receiving said first digital data stream at said second node of said teleconference system via said computer network; extracting said first audio characterising data from said digital data stream at said second node; processing said received first audio at said second node in conjunction with said extracted first audio characterising data to determine a first-second node time offset between said first audio received at said second node and said first digital data stream received at said second node; and synchronising said received first audio and said received first digital data stream by adjusting one or both of i) a time delay of one of said received first audio and said received first digital data stream with respect to the other at said second node responsive to said determined first-second node time offset; and ii) a time delay of one said first audio and said first digital data stream with respect to the other at said first node responsive to said determined first-second node time offset.

The teleconference may have just two nodes, that is, it may be a point-to-point call, or may have more than two connected nodes. In embodiments the first digital data stream may comprise a video data stream from a video camera, captured at the first node. Depending upon the number of other nodes connected to the teleconference system, synchronisation may either be achieved by locally delaying, for example, the received audio to align this with the received video at a receiving node or, in a system with more than two nodes, by delaying the transmitted audio from each of the nodes so that when the audio is mixed together in a telephone conference bridge, all audio channels are in time synchronisation with each other. Once this has been established, the combined audio received from the conference bridge and separate video channels received from the other nodes can be aligned by adding appropriate time delay offsets at the receiving node (noting that in embodiments a node receives the video streams separately from the other nodes).

In some preferred embodiments the time offset at the receiving node is determined by applying a corresponding audio characterising function to the received audio as that used to generate the audio characterising data at the transmitting node; this audio characterising data can then aligned to determine a time offset, for example by simple comparison, correlation or other techniques.

In embodiments the audio characterising data includes data identifying a pattern of sound level variation, and the comparing (or similar) disregards sound levels below a threshold level, or at least weights these to have a reduced significance. This facilitates alignment where multiple audio streams are present simultaneously on a single audio line. The audio provided to the telephone network may be provided via an audio characterising module or it may be provided directly to the phone network and an audio characterising module may listen in on the audio to determine the audio characterising data.

In embodiments the telephone system comprises three or more nodes, and corresponding techniques to those described above are employed to determine time offsets between each video stream received at the local node and the combined audio stream received from the audio conference bridge. Any of a range of techniques may be used to determine the time offset between each video stream and every other video stream, for example by comparing embedded timestamps against a master reference transmitted over a control channel. From these results, the time offset between the multiple audio streams mixed together in the audio received from the conference bridge can be determined. These calculated time offsets are communicated to each of the remote nodes over the computer network. Each remote node is then able to delay its outgoing audio stream so as to ensure that all audio streams arrive at the conference bridge in sync with each other. With this first aspect of synchronisation achieved, the local node can now apply delays to the combined audio feed from the conference bridge and/or each video stream received separately in order to complete the synchronisation.

Where the digital data stream comprises a video data stream, in embodiments the audio characterising data changes no faster than every half a frame duration of the video in the video data stream, for example no greater than 15 Hz where the video is at 30 frames per second, to inhibit aliasing.

The invention also provides a system for synchronising a teleconference comprising audio carried on a telephone network and a digital data stream carried on a computer network, the system comprising a plurality of nodes each having a first interface for a phone, a telephone network interface for connecting to a telephone network, and at least one computer network interface for connecting to a computer network, and wherein said nodes are configured to: input first audio for said teleconference at a first node of a teleconference system; process said first audio to determine first audio characterising data characterising said first audio; provide said first audio to a telephone network providing an audio teleconference; input at said first node a first digital data stream for said teleconference; insert said first audio characterising data into said first digital data stream; forward said first digital data stream over said computer network; receive said first audio at a second node of said teleconference system coupled to said telephone network, wherein said second node is a participant in said audio teleconference; receive said first digital data stream at said second node of said teleconference system via said computer network; extract said first audio characterising data from said digital data stream at said second node; process said received first audio at said second node in conjunction with said extracted first audio characterising data to determine a first-second node time offset between said first audio received at said second node and said first digital data stream received at said second node; and synchronise said received first audio and said received first digital data stream by adjusting one or both of i) a time delay of one of said received first audio and said received first digital data stream with respect to the other at said second node responsive to said determined first-second node time offset; and ii) a time delay of one said first audio and said first digital data stream with respect to the other at said first node responsive to said determined first-second node time offset.

The invention further provides processor control code to implement the above-described systems, nodes, and methods, for example on a general purpose computer system or on a digital signal processor (DSP). The code is provided on a physical carrier such as a disc, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

In a further aspect the invention provides a node unit for synchronising a teleconference comprising audio carried on a telephone network and a digital data stream carried on a computer network, the node unit comprising a first interface for a phone, a telephone network interface for connecting to a telephone network and at least one computer network interface for connecting to a computer network, a time offset measurement system coupled to said computer network interface and to said telephone network interface, to determine a time offset between audio on said telephone network interface and data characterising said audio in a digital data stream on said computer network interface, and wherein said node unit is configured to perform one or both of i) local control of a relative time offset between audio received from said telephone network interface and said digital data steam, and ii) transmission of data representing said time offset over said computer network to at least one other said node unit.

In embodiments the node unit includes a controllable audio delay (which may be implemented digitally) between the phone interface and telephone network interface of the node unit, having a delay control input coupled to the computer network for remote control of the delay, for example by another node unit and/or a system control server. In embodiments this controllable delay controls a delay in outgoing or transmitted audio from the phone to the telephone network. In embodiments the node unit also includes a controllable received audio delay, also coupled between the telephone network interface and the phone interface, and having a delay control input, and, in embodiments, a controllable digital data stream (video) delay coupled between the computer network connection and a digital data output of the node unit. Both the received audio, and video controllable delays may be coupled to a skew (time offset) controller to control one or both of these delays, in particular in response to a time offset determined by comparing audio characterising data extracted from the digital data stream with corresponding audio characterising data generated from the received audio. In embodiments this skew control unit also has a time offset data output coupled to the computer network to provide time offset data to one or more of the other nodes and/or a system control server. The skilled person will appreciate that depending upon the implementation, for example, whether there are two or more than two video nodes in the system, not all of these node unit modules may be required.

BRIEF DESCRIPTION OF THE DRAWINGS

These and other aspects of the intention will now be further described, by way of example only, with reference to the accompanying figures in which.

DETAILED DESCRIPTION OF PREFERRED EMBODIMENTS

Broadly speaking we will describe a video conferencing system in which video is added to a pre-existing ordinary telephone call. Thus embodiments of the video conferencing system add video transmitted over an IP network to a telephone call placed using pre-existing telephone equipment and infrastructure. We will describe procedures for automatically establishing such a video conference, and also techniques for use in such a video conference for ensuring that the video and audio are matched in time, so that participant's lips move with the sound of their voices.

The approach conveys a number of benefits: The audio part of the call retains the simplicity, familiarity and reliability of an ordinary phone call. The video is an enhancement, but it does not get in the way of placing or conducting a phone call. Users do not have to replace existing conference phones or use a different microphone for video conferences versus audio conferences. For conference calls, it becomes very easy to mix some participants with audio-only and others who have audio and video. Moreover, if the IP network used by the video channel is heavily congested and video quality is affected, communication can continue uninterrupted as audio-only.

In a typical audio teleconference, the parties dial a number followed by a PIN (Personal Identification Number). Normally there is one PIN for the host and a separate PIN for the guests. Teleconference service providers have local phone numbers in many geographies to reduce the cost of participation. Having dialled a normally local number, plus a PIN, the participants are able to talk to each other in a multi-way audio conference.

Often, the audio participants will want to share other electronic information with each other, which could be presentations, white-board sketches or streaming video. Currently this is either done by email (e.g. for PowerPoint), using a service provider that gives a URL for the participants to enter into their web browser (e.g. WebEx), or using a unified communications provider where such services are integrated with the audio (e.g. Skype).

Whilst many people are familiar with audio conferences, accessing associated digital content to accompany the audio is often a time-consuming process which often delays the start of multi-party meetings. This is especially noticeable in video telephony. Where AV/IT equipment is installed in meeting rooms to facilitate rich communication, associated remote controls, touch panels and the like often serve to be a barrier to effective use of this equipment.

At a high level, therefore, we will describe techniques which enable parties to access a hosted audio conference using their existing telephone equipment and conference provider, and having accessed said audio conference will automatically connect an associated piece of IT equipment with similar pieces of IT equipment in the rooms of the other audio conference participants to facilitate the fast and easy sharing of associated digital media. Broadly the system comprises two parts, a phone tap device (node unit or "endpoint"), and a system control server. The phone tap or node unit has two telephone interface; one to the local telephone and one to the exchange (PBX). It also has a network interface in order to communicate with the system control server, and an interface specific to the IT equipment being connected to the hosted audio conference.

When a user wishes to join an audio conference, they take the phone off-hook and dial as they would normally do. On dialling out, the Phone Tap recognizes DTMF tones and optionally sends the dialled number to the control server. The Phone Tap acts as a pass-through, enabling normal 2-way audio communication whilst being capable of recognizing tones played on the audio conference, received from the PBX.

The control sever optionally sends a unique-in-time code back to the Phone Tap, which on receipt the Phone Tap will play as tones out to the PBX. If the Phone Tap hears any tones being played while it is playing its tones, it will back-off and retry the code until it is certain that any other audio participants can have unambiguously received the code.

On detecting a series of tones coming from the PBX, the Phone Tap will encode these and report the code back to the control or rendezvous server. Using this information, the Rendezvous Server is able to determine which Phone Taps are connected to the same audio conference without Phone Taps having to reply to each others codes over the audio channel.

Having made this determination, the rendezvous server can send a unique-in-time identifier to each Phone Tap, which the Phone Tap passes back to the associated IT equipment. The IT equipment uses this unique identifier to automatically share digital media. Examples of this identifier are a URL for joining a shared-desktop, or an IP address for transmitting or receiving streaming data.

Figure 1A:
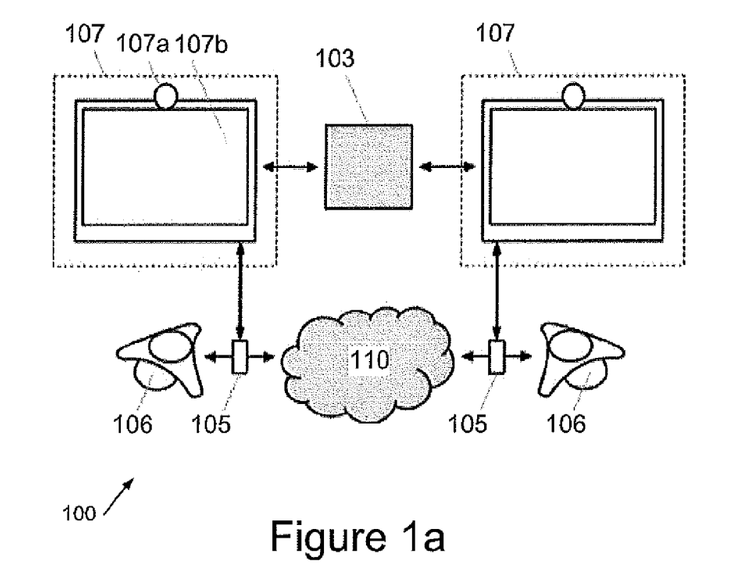
FIGS. 1a and 1b show respectively, an overview and a detailed view of a video teleconferencing system according to an embodiment of the invention.

Referring now to FIG. 1a, this shows an overview of an embodiment of a video conferencing system 100 according to the invention. The system comprises IT (Information Technology) equipment which is automatically connected when connecting to an audio teleconference in a preferred embodiment comprising a pair of video capture/display units 107 each comprising a video camera 107a and a display 107b. The video units 107 are each connected to an IP (Internet Protocol) network 103, in particular a public IP network such as the Internet. The system 100 also includes a pair of standard audio telephones 106 each connected to a public POTS telephone network 110. The system also includes a pair of node units 105, also termed herein endpoints/phone taps. Each of units 105 is coupled between the phone 106 and the telephone network 110 and has a further network connection to a respective video unit 107. The skilled person will appreciate that in the arrangement of FIG. 1*a* a video unit 107 may have only a single network connection rather than the pair of network connections illustrated. Broadly speaking in operation the node units 105 are able to intercept and modify, in particular delay, sound on the telephone network, and displayed video.

Figure 1B:
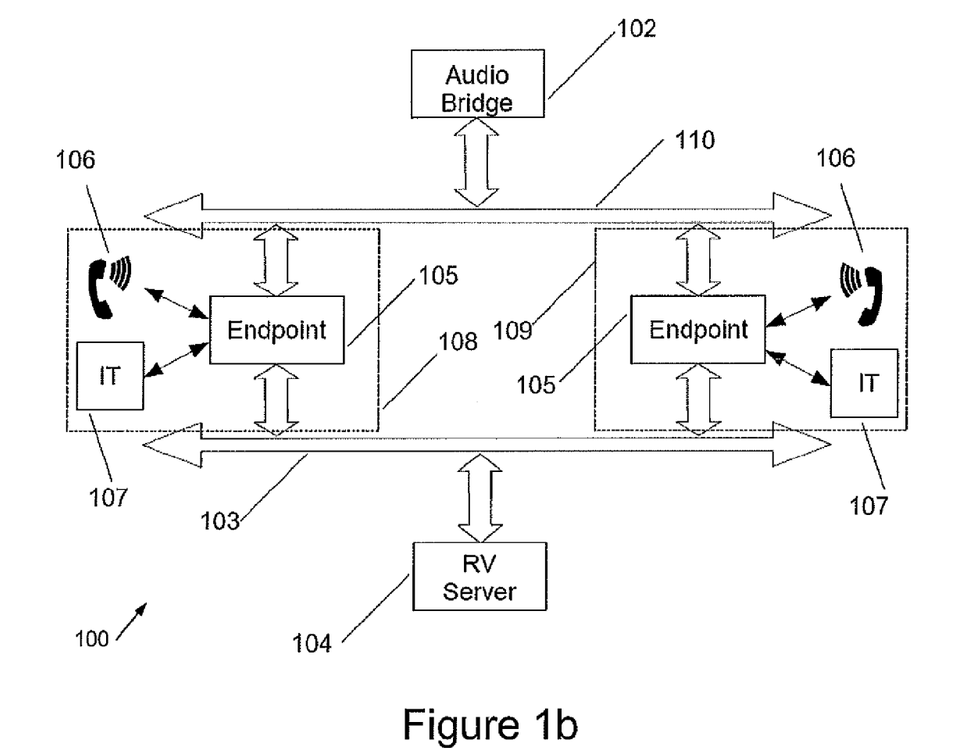

Referring next to FIG. 1*b* this shows further details of the system of FIG. 1*a*, illustrating a third party audio conference bridge 102 connected to the telephone network 110. Typically such an audio bridge enables multiple audio conferencing parties to dial the same number with a different pin to connect to a shared audio teleconference managed by audio bridge 102. The system 100 also comprises a system control or 'rendezvous' server 104, in embodiments accessible via the internet, and running processor control code (software) to implement a 'switching' procedure as described later. The server 104 operates in conjunction with the endpoint or node units 105, which also run software as described below, for automatically establishing IT connectivity between IT equipment units 107. Typically the phone 106 and IT equipment 107 of the nodes are located in different office locations. For simplicity FIG. 1 shows just two nodes but the skilled person will appreciate that there may be many such nodes in a shared teleconference.

Figure 2A:
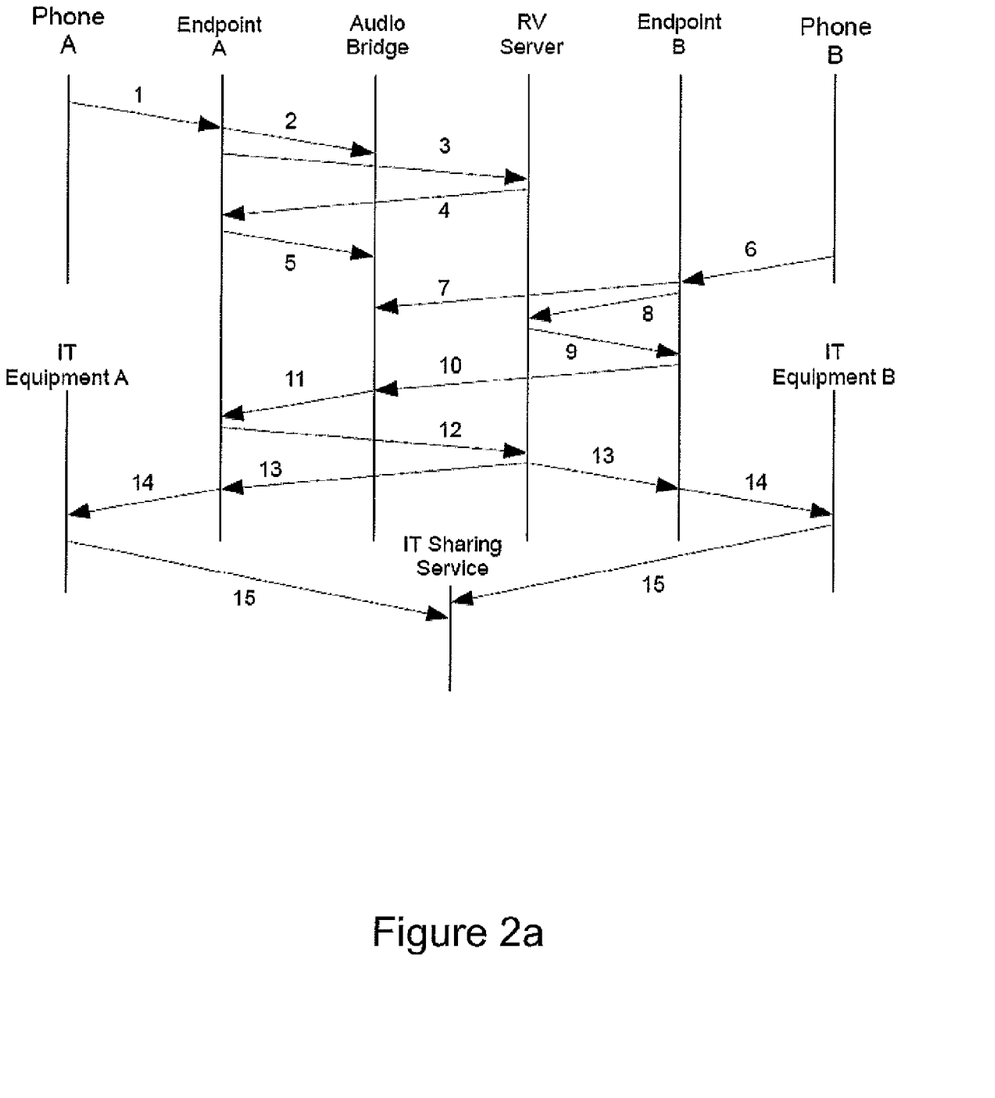
FIGS. 2a and 2b show, respectively, first and second examples of message passing during automatic connection of computer equipment between participants in an audio teleconference, according to embodiments of the invention.
Figure 2B:
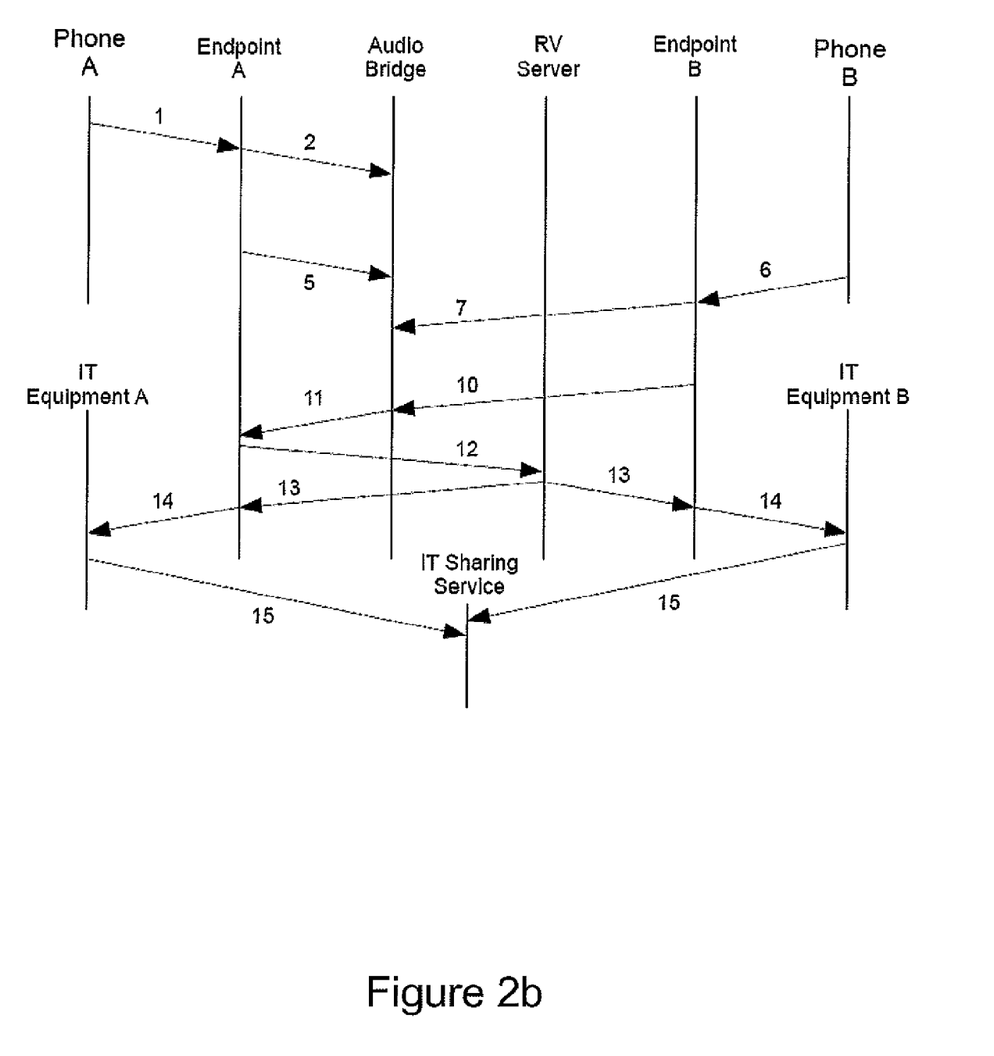

FIGS. 2*a* and 2*b*, these show messages passing between the various elements of system 100 according to a method for automatic connection of the IT equipment between participants in an audio teleconference according to an embodiment of the invention. In FIGS. 2*a* and 2*b* the two nodes are designated 'A' and 'B'. The message passing illustrated in FIGS. 2*a* and 2*b* is implemented by corresponding software running on the node units 105 and server 104. FIG. 2*b* illustrates a variant of the protocol of FIG. 2*a* in which some messages (messages 3 and 4 and 8 and 9) are omitted.

Thus, referring to the numbered messages in FIGS. 2*a* and 2*b*, the protocol of FIG. 2*a* is as follows:

1) Telephone A dials into an audio bridge
2) Endpoint A detects the phone number that is dialled, but passes the audio through to the audio bridge
3) If Endpoint A decides that the phone number dialled may be able to share digital media, it sends a message to the Rendezvous (RV) server which includes the phone number and its own unique endpoint identifier
4) If the RV server further determines that it is likely that sharing of digital media may take place, the RV server sends a temporary unique code back to endpoint A
5) Endpoint A announces itself in the audio bridge by playing a sequence of tones derived from the unique code received in (4). Endpoint A listens for tones from the audio bridge; if tones are heard whilst Endpoint A is announcing itself, it will back off and retry some random time later. Once tones have been successfully announced, Endpoint A enters 'listening' mode.
6) At some point later, Telephone B dials into the audio bridge
7) Endpoint B detects the phone number that is dialled, but passes the audio through to the audio bridge
8) If Endpoint B decides that the phone number dialled may be able to share digital media, it sends a message to the Rendezvous (RV) server which includes the phone number and its own unique endpoint identifier
9) If the RV server further determines that it is likely that sharing of digital media may take place, the RV server sends a temporary unique code back to endpoint B
10) Endpoint B announces itself in the audio bridge by playing a sequence of tones derived from the unique code received in (9). Endpoint B listens for tones from the audio bridge; if tones are heard whilst Endpoint B is announcing itself, it will back off and retry some random time later. Once tones have been successfully announced, Endpoint B enters 'listening' mode.
11) The audio bridge transmits the tones played by Endpoint B back to Endpoint A over the POTS network
12) Endpoint A detects the tones, transforms them into a code and transmits that code to the RV server along with its own unique endpoint identifier
13) The RV server has been able to determine that Endpoints A and B are in the same audio conference by matching the code sent to Endpoint B with the code received from Endpoint A. The RV server generates a unique-in-time sharing-identifier which will allow IT equipment A and IT equipment B to share digital media through a $3^{rd}$ party sharing service. The RV server sends this sharing-identifier to Endpoints A & B
14) Endpoints A and B each pass this sharing-identifier to their attached IT equipment
15) IT Equipment A and B use their sharing identifiers to connect using an IT sharing service In the variant of FIG. 2*b*, messages 3, 4, 8 and 9 are omitted. Then the tones that the Endpoints use to announce themselves may be some transformation of the endpoint's own unique identifier. The transformation is chosen to allow Network Address Translation (NAT) at stage (13) and may, for example, be lossless.

Figure 3A:
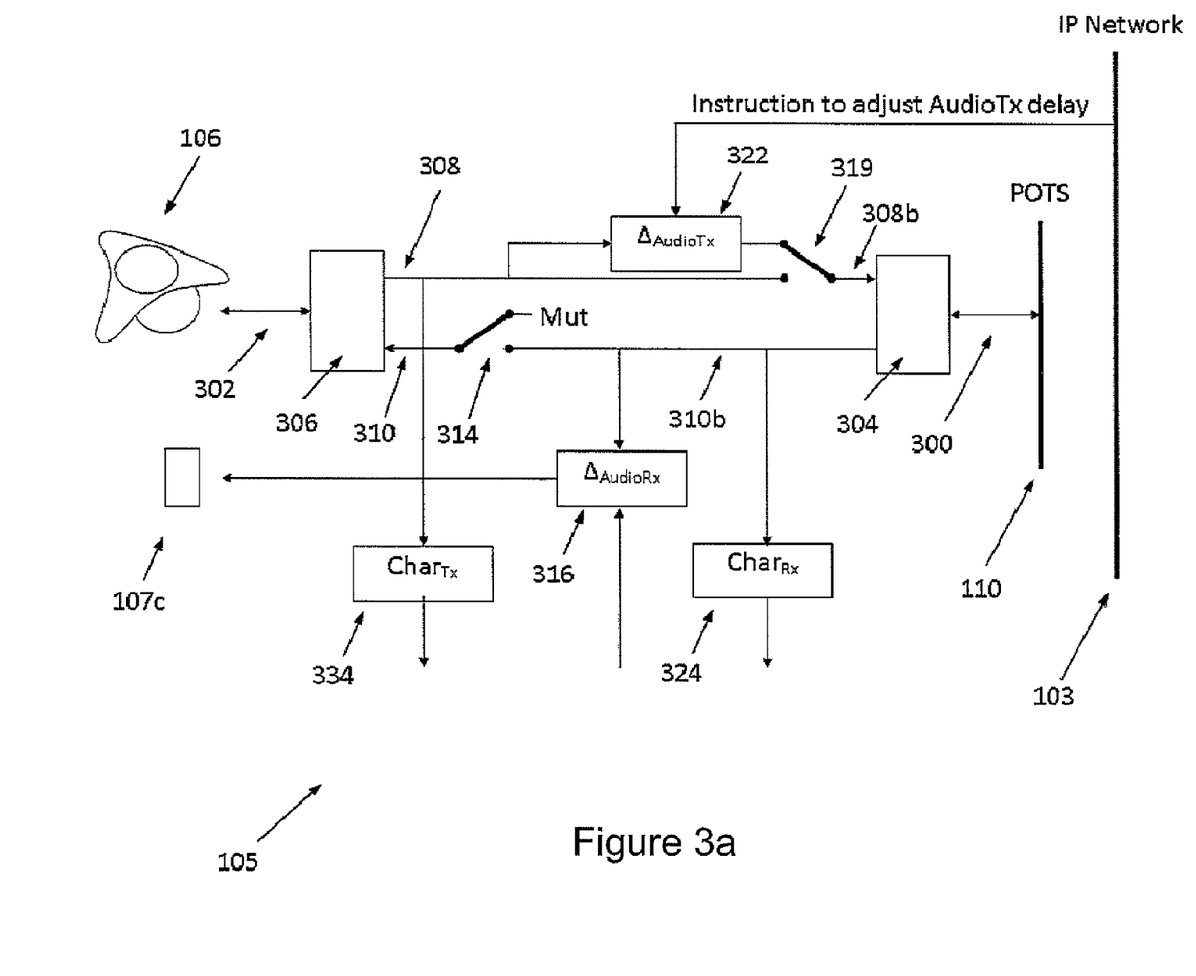
FIGS. 3a and 3b show, respectively, a telephone interface and a node unit or 'endpoint' according to an embodiment of the invention.
Figure 3B:
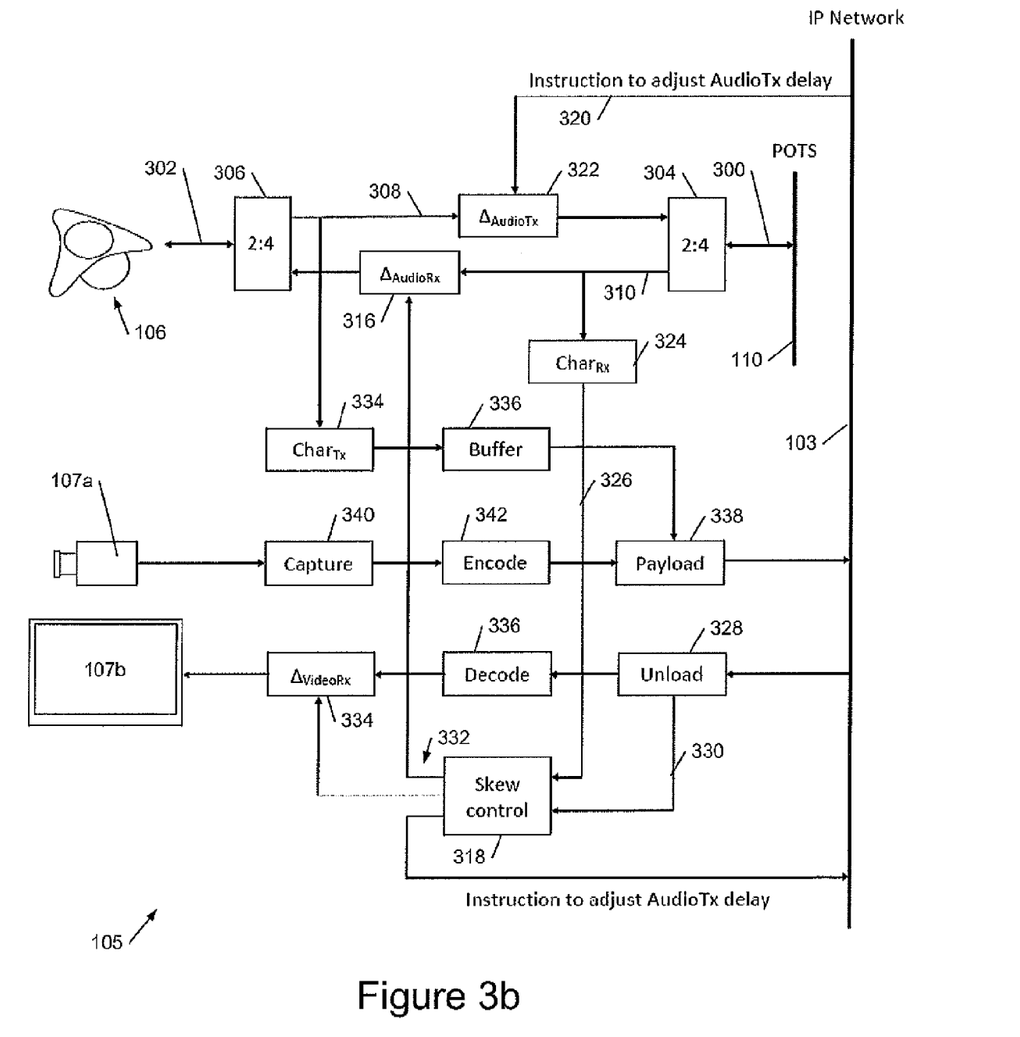

FIG. 3*a* shows a telephone interface portion of a node unit 105, illustrating a connection 300 to the telephone network 110, in this example the connection comprising a two wire interface. A connection 302 to analogue phone 106 likewise comprises a two wire interface. A subscriber line interface circuit 306 converts the differential signal into an audio transmit (from the phone) line 308 and an audio receive (to the phone) line 310. A corresponding PSTN (Public Switched Telephone Network) interface 304 re-converts the signals back to the two-wire interface 300. A switch 314 selectively connects the audio receive line 310 to either the phone interface 304 or to a suitable termination to mute the phone 106. The audio receive signal 310*b* is also connected to a variable delay circuit 316 which in turn is connected to a speaker 107*c*. With the switch in the position shown, sounds (audio) received from a remote telephone are not relayed to the local handset but instead pass through the variable delay circuit 316 before being played on a speaker 107*c*, which may be located next to the video display 107*b* so that the sound comes from the same direction as the image of the person speaking. (Alternatively the audio output of delay circuit 316 may be provided back to phone 106). With the switch in the alternative position a normal telephone call can take place where audio received from a remote telephone is relayed directly to the local handset. In this mode the output of delay circuit 316 is muted to prevent sound from being heard from the speaker 107*c* as well as the local telephone.

A second switch 319 selectively connects the audio transmit line 308*b* to either the phone interface 306 or to the output of a variable delay circuit 322. With this switch in the position shown audio transmitted by the local handset passes through the variable delay circuit 322 before being sent to the remote telephone. Via appropriate settings of the two switches, the interface 105 is able to selectively delay both sounds picked up by the local telephone's microphone and also sounds received from a remote telephone over the POTS network. In addition it is able to divert sounds received from the remote telephone for playback over a speaker instead of the telephone. Details of how the delays to be applied by circuits 316 and 322 are determined from the audio characteristics generated by circuits 334 and 324 are described in FIG. 3b.

FIG. 3b shows details of an embodiment of a node unit or endpoint 105 in which like elements to those previously described are indicated by like reference numerals.

Thus referring to FIG. 3b an instruction to adjust the audio transmission delay is received via a logical connection 320 to IP network 103 and used to control a variable audio transmission delay module 322 coupled between the audio output of phone 106 and the POTS 110. In this way audio between 3 or more nodes in a conference call may be synchronised.

Audio received from POTS 110 and provided on line 310 is provided to an audio characterising module 324 which determines characteristic data for the audio signal from the telephone network and provides a characterising data output 326. An unload module 328 logically coupled to IP network 103, receives the video signal for the node from the network and extracts the audio characterising data from this video signal providing this data on line 330. Skew control circuit compares the data on lines 326 and 330, for example by performing a cross-correlation, to determine a time offset between the audio timing encoded on the video signal and the received audio timing, and this time offset data is provided on a set of outputs 332. One of outputs 332 controls a variable delay applied by module 316 to the received audio intended for output by phone 106. another of outputs 332 provides a delay control input to a received video delay module 334, which receives a video stream from video decoder 336 coupled to unload module 328, and provides a (delayed) video output to display 107b. A third output 332 is logically coupled to IP network 103 to provide data for adjusting an audio transmission delay to one or more other nodes or endpoints 105 in the video conference.

The local audio from phone 106 for transmission over the POTS 110 is similarly characterised by module 334, and this audio characterising data is buffered by module 336 and combined with video data in network payload data construction module 338. This module also receives video from camera 107a, captured by module 340 and encoded by module 342, the digitally encoded video data and characteristic audio data being combined and provided to IP network 103.

The skilled person will appreciate that the above described modules may be implemented in hardware, software, or a combination of the two.

In operation the near end video conference unit samples sound recorded by the near end telephone and digitizes it. The digital samples are then processed to produce a simplified characteristic of the original audio signal. In its simplest form this characteristic divides the audio signal into equal length periods, and for each period record whether the average sound amplitude was greater than a threshold level of background noise. This characteristic gives a pattern of sound/no-sound values representing the transmitted audio signal. We will use this simple characteristic in the examples which follow because it makes the process of correlating the characteristics easy to visualise. However variations in gain across the telephone network, signal processing, distortion and noise contribute to reducing the reliability of using a threshold to characterise the audio signal. Preferably, rather than quantising the sound (for example, average sound amplitude) in a given period to a single bit using a threshold, it is quantised using multiple bits, for example 15 bits giving a range from 0-32767. Greater reliability may be obtained by using more complex characteristics of the sound (for example taking a Fourier transform of the audio signal to determine the amount of energy in different frequency bands), at the cost of employing more compute power to calculate the characteristics, and at the cost of using more bandwidth in the computer network to transmit these. In theory, the entire digitised audio stream could be transmitted without modification or with a lossless compression technique.

Whichever characteristic is used, the near end video conference unit adds the characteristic to the video frame data it captured at the same time as the audio was recorded. It then transmits this characteristic with the video frame over the video transmission channel. This may be an IP network, but other transmission channels are possible. At the far end, the far end video conference unit receives the video frame with associated audio characteristic. It independently samples sound received by the far end telephone from the telephone network and then performs a substantially identical characterisation of the received sound, for comparison with the characteristic embedded in the video to determine a time offset between the two. The two characteristics may be correlated to determine the time (phase) offset.

Example 1

Video frame rate is 30 frames per second, and each frame is embedded with an audio characteristic representing speech or no speech during the 33 ms of time the video frame represents.

Over the first second of transmission, the near end produces the following characteristic from locally recorded audio:
00101110100101101110101010001011
Over the same second, the far end identifies the following characteristic in the received audio signal:
10110100010111010010110110101
On comparing the two characteristics, the receiver is able to determine a unique solution for the offset between them:
    00101110100101101110101010001011
10110100010111010010110110101

In this example audio lags video by 7 frames which is 233 ms. A 233 ms delay can now be added to the video pipeline to bring the two into synchronisation.

There are two complications this approach has to handle which are introduced through the use of audio conferencing numbers.

Non-Video Participants

If an audio conference between two video endpoints also includes a non-video participant then the characteristic derived from audio heard at the receiving endpoints will not match the characteristic transmitted with the video. The effect of audio mixing in the additional caller will be to average the audio signals for which we have characteristics with one which we do not have a characteristic for. For a simple case using a threshold characteristic, some periods of not-sound will be converted to periods of sound. The technique can still cope with this by looking for matching periods of sound, and ignoring periods of not-sound. The sound pattern encoded with the video becomes for example 1x111x1x1x111x1x11x where x indicates "don't care". This increases the chances of a false match but this can be compensated for by using longer sequences of patterns for comparison.

Multi-Way Calling

If there are more than two video endpoints in a conference then lip sync becomes more complex, because although each endpoint receives the video streams separately, it only gets a combined audio feed from the telephone network. Unless the audio delays from all the units to the conference bridge in the telephone network are equal it is difficult to for a receiving endpoint can correct the different audio delays mixed up in the combined audio feed. To address this endpoints apply a delay to the audio they transmit as well as the audio they receive. Each endpoint learns from the other endpoints how much delay it should apply to its outgoing audio. Using the sound characteristic technique an endpoint in a three way call will receive a sound characteristic from each of the other two endpoints in their video streams, as well as calculating a sound pattern from the audio it receives from the conference bridge.

Example 2

Conference bridge sound characteristic
11010111110110101101010001010100
From A's video stream
1x11xxx11x1x1xx
From B's video stream
x1x111x1x1xx1x1
Here are the matches
11010111110110101101010001010100
  1x11xxx11x1x1xx
  x1x111x1x1xx1x1

In this example we have successfully identified a unique solution for both delays using just half a frame of sound characteristics.

Figure 4A:
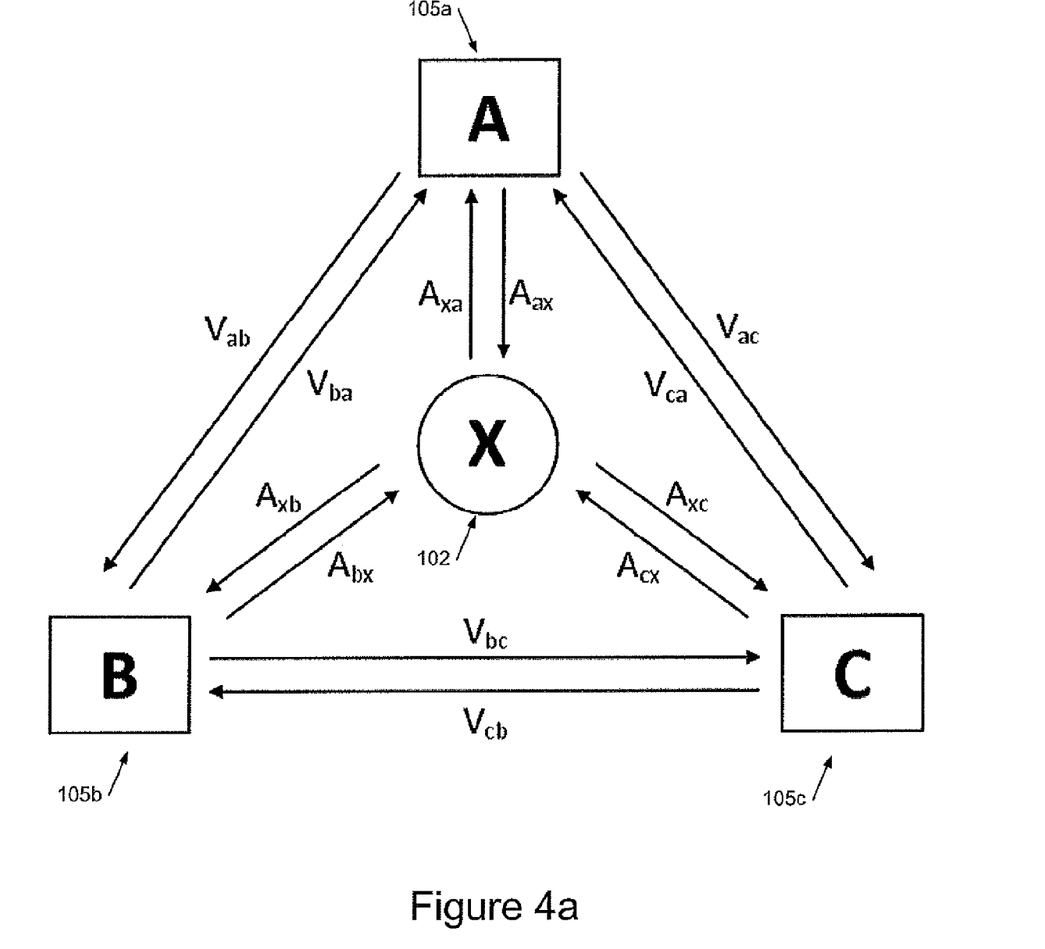
FIGS. 4a and 4b illustrate a procedure which may be employed for a synchronisation process for a node unit or 'endpoint', according to an embodiment of the invention.

Referring now to FIG. 4a, this illustrates synchronization in a video conference with three endpoints A, B and C 105a, b, c sharing an audio conference bridge X 102, such as "MeetingZone". In FIG. 4a:

$V_{ab}$ is the end-to-end delay transmitting video from A to B.
$A_{ax}$ is the end-to-end delay transmitting audio from A to the conference bridge X.
$A_{xa}$ is the end-to-end delay transmitting audio from A to the conference bridge X.

Each endpoint is capable of measuring the difference (skew) between an incoming audio stream and its corresponding video stream using the technique described above. For endpoint A:

$$Skew_b = A_{bx} + A_{xa} - V_{ab}$$

$$Skew_c = A_{cx} + A_{xa} - V_{ac}$$

The skew will be negative if the video arrives after the audio and positive if the video arrives first.

Each endpoint is capable of inserting additional delay into its incoming audio feed, outgoing audio feed and incoming video feed(s). So endpoint A is capable of increasing:

$$A_{xa}, A_{ax}, V_{ba}, V_{ca}$$

In one approach each endpoint increases the incoming video delays until they are equally skewed relative to their respective audio streams i.e. For a given endpoint, the algorithm is: increase the incoming $V_{??}$ delays until all the $Skew_?$ values are equal. Then if the $Skew_?$ values are greater than zero, increase all the $V_{??}$ delays until $Skew_?$ is zero. If the $Skew_?$ values are less than zero, increase the incoming audio delay $A_{x?}$ until they become zero. This approach does not require the endpoints to communicate with each other for synchronization as each endpoint can calculate and apply all necessary delays without referring to any other endpoint. However this simple method can increase the worst-case delay between callers. This is undesirable because as delays become longer it becomes harder for callers to maintain a natural interactive conversation. Furthermore this approach will not synchronise any video/audio pair to any other video/audio pair in the conference. It only ensures that considered individually, each stream has its audio in sync with its video.

Figure 4B:
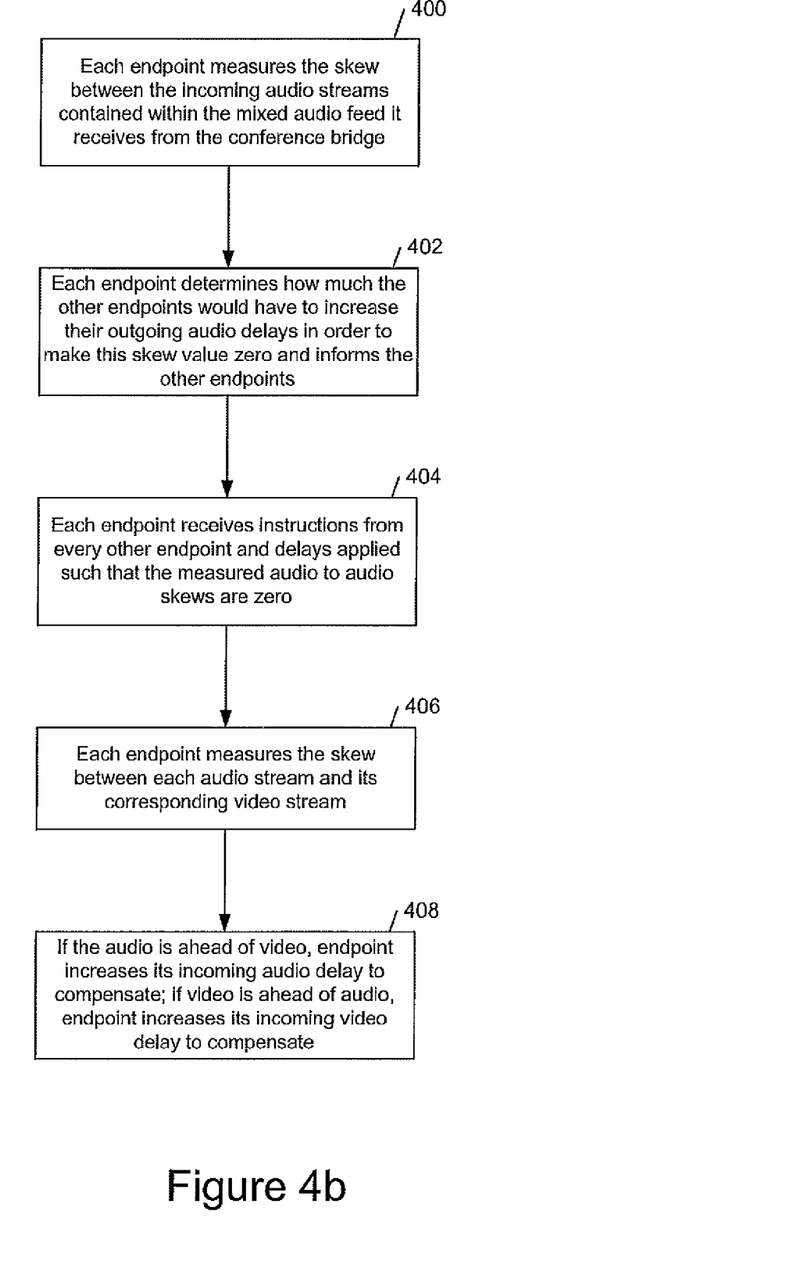

A better solution uses the procedure of FIG. 4b. In order to use this approach the endpoints need to determine the skew between the video streams. This can be achieved using a prior art technique described in 'Voice and Video conferencing Fundamentals'. In summary this is done by sharing a master reference clock across all the endpoints and encoding timestamps in the video streams which are relative to the master clock. With this additional information each endpoint can now calculate the skew between audio streams as follows:

$$Skew_b - Skew_c = A_{bx} + A_{xa} - V_{ab} - (A_{cx} + A_{xa} - V_{ac})$$
$$= A_{bx} - A_{cx} + V_{ac} - V_{ab}$$
$$A_{cx} - A_{bx} = V_{ac} - V_{ab} + Skew_c - Skew_b$$

Now referring to the steps in FIG. 4b:

1) Each endpoint measures the skew between the incoming audio streams contained within the mixed audio feed it receives from the conference bridge (Step 400). For example in the three way call shown in FIG. 4a, endpoint A measures: $Skew_{bc} = A_{bx} - A_{cx}$
2) Each endpoint then determines how much the other endpoints would have to increase their outgoing audio delays in order to make this skew value zero and transmits appropriate instructions to the other endpoints over the IP network (Step 402).
3) Each endpoint will receive instructions from every other endpoint (Step 404). Continuing this three-way example, endpoint B will receive instructions to increase its outgoing audio delay $A_{bx}$ from endpoints A and C. Endpoint B applies the largest delay requested by any other endpoint.
4) Audio to audio skews measured in (1) will now be zero. Each endpoint now measures the skew between each audio stream and its corresponding video stream (Step 406).
5) If the audio is ahead of video, the endpoint increases its incoming audio delay to compensate; if video is ahead of audio, the endpoint increases its incoming video delay to compensate (Step 406).

Preferred embodiments of the above described techniques are used to synchronise audio with digital data streams carrying a corresponding video. However the skilled person will appreciate that the techniques may also be employed to synchronise digital data streams carrying other forms of digital data.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A system for automatic connection of computer equipment between participants in an audio teleconference, the system comprising:
    at least two node units, each said node unit having a phone audio connection to provide an audio interface with a phone, a telephone network audio connection to provide an audio interface with a phone network, and at least one computer interface for interfacing with computer equipment and a computer network, the at least one computer interface comprising at least one computer network connection; and a system control server having an interface to said computer network;

wherein a said node unit comprises node processor control code to:

transmit an outgoing audio announce message into a potential conference call via said telephone network audio connection, wherein said outgoing audio announce message identifies said node unit connecting to said potential conference call;

receive via said telephone network audio connection an incoming said audio announce message from a conference call to which the node unit is already connected;

determine, from said incoming audio announce message, an identifier identifying a remote node unit connecting to said conference call; and transmit, via said computer network to said system control server, responsive to said received message, both an identifier for said node unit and said identifier for said remote node unit; and wherein said system control server comprises server processor control code to:

receive said identifiers for said node unit and for said remote node unit; and provide computer equipment connection data to respective computer equipment for each of said identified node unit and said identified remote node unit, to enable connection between said respective computer equipment of said node units.

2. A system as claimed in claim 1 wherein each said node unit comprises a pair of said network connections, one for interfacing with computer network and one for interfacing with said computer equipment for the node unit; and wherein said connection data comprises sharing identifier data for connecting the computer equipment of said respective said node unit to a digital media sharing service; and wherein said server processor control code is configured to send said sharing identifier data to each said node unit, for a said node unit to provide to said respective computer equipment for the node unit.

3. A system as claimed in claim 2 comprising at least three said node units, wherein phones of said at least three node units connect with a shared audio teleconference bridge via respective telephone network audio connections, and wherein operation of said node and server processor control code connects said respective computer equipment of said at least three node units to said digital media sharing service such that said digital media sharing service operates over said computer network separately from audio of said node units shared by said audio teleconference bridge.

4. A system as claimed in claim 1, wherein said node processor control code further comprises code to request and receive a temporary identifier for the requesting node from said server, wherein said request includes one or both of an identifier of said requesting node and a computer network address of said requesting node;

wherein said node processor control code further comprises code to encode into said outgoing audio announce message said temporary identifier, wherein said identifiers for said node unit and said remote node unit comprise, respectively, a said temporary identifier received from said server and a said temporary identifier from said remote node unit decoded from said incoming audio announce message; and wherein said server processor control code further comprises code to receive said request for a temporary identifier from said requesting node, generate a said temporary identifier, and return said generated temporary identifier to said requesting node using one or both of said identifier of said requesting node and said computer network address of said requesting node.

5. A system as claimed in claim 1, wherein said node processor control code further comprises code to generate an identifier for the node from an internal stored unique identifier for the node, and to encode said generated identifier into said outgoing audio announce message; and wherein said node processor control code further comprises code to detect connection of a said node unit to a potential conference call; and to transmit said outgoing audio announce message following said potential connection detection.

6. A system as claimed in claim 5 wherein said node processor control code further comprises code to send a connection detection message to said server identifying detection of said potential conference call; and to receive a response to said connection detection message from said server for use in said transmission of said outgoing audio announce message.

7. A system as claimed in claim 6 wherein said node processor control code further comprises code to monitor said telephone network audio connection to identify a phone number dialled by a phone connected to the node unit, and wherein said server processor control code further comprises code to process said phone number to identify a said conference call and to transmit data to said node unit identifying said dialled number to confirm said potential conference call is a conference call.

8. A system as claimed in claim 1 wherein said node processor control code further comprises code to monitor said telephone network audio connection to identify a phone number dialled by a phone connected to the node unit, and to process said phone number to detect said potential conference call.

9. A system as claimed in claim 1 wherein said node processor control code further comprises code to monitor said telephone network audio connection to detect and resolve a conflict between audio announce messages when transmitting said outgoing audio announce message.

10. A system as claimed in claim 1 wherein said computer equipment comprises video display computer equipment, wherein said connection between said respective computer equipment of said node units comprises a streamed video connection, and wherein a said node unit further comprises a system to sense and control delay of audio data between said phone audio connection and said audio interface with said phone network to synchronise said streamed video over said computer network with said audio over said telephone network audio connection;

wherein said computer network is an IP network and said connection data comprises an IP address of a shared media server.

11. A node unit as claimed in claim 1 comprising a phone audio connection to provide an audio interface with a phone, a telephone network audio connection to provide an audio interface with a phone network, and at least one computer interface for interfacing with computer equipment and a computer network, the at least one computer interface comprising at least one computer network connection; the node unit further comprising a processor, working memory and program memory storing node processor control code to:

transmit an outgoing audio announce message into a potential conference call via said telephone network audio connection, wherein said outgoing audio announce message identifies said node unit connecting to said potential conference call;

receive via said telephone network audio connection an incoming said audio announce message from a conference call to which the node unit is already connected;

determine, from said incoming audio announce message, an identifier identifying a remote node unit connecting to said conference call; and transmit, responsive to said received message, an identifier for said node unit and said identifier for said remote node unit, via said computer network to said system control server.

12. A node unit as claimed in claim 11 wherein said processor control code is further configured to detect connection of a said node unit to a potential conference call; and to transmit said outgoing audio announce message following said potential connection detection.

13. A node unit as claimed in claim 12 wherein said processor control code is further configured to send a connection detection message to said server identifying detection of said potential conference call; and to receive a response to said connection detection message from said server for use in said transmission of said outgoing audio announce message.

14. A non-transitory data carrier for a node unit as recited in claim 1, said carrier carrying node processor control code to:

transmit an outgoing audio announce message into a potential conference call via said telephone network audio connection, wherein said outgoing audio announce message identifies said node unit connecting to said potential conference call;

receive via said telephone network audio connection, and decode, an incoming said audio announce message from a conference call to which the node unit is already connected;

determine, from said incoming audio announce message, an identifier identifying a remote node unit connecting to said conference call; and transmit, responsive to said received message, an identifier for said node unit and said identifier for said remote node unit, via said computer network to said system control server.

15. A non-transitory data carrier as claimed in claim 14 wherein said node processor control code further comprises code to detect connection of a said node unit to a potential conference call; and to transmit said outgoing audio announce message following said potential connection detection.

16. A non-transitory data carrier as claimed in claim 15 wherein said node processor control code further comprises code to send a connection detection message to said server identifying detection of said potential conference call; and to receive a response to said connection detection message from said server for use in said transmission of said outgoing audio announce message.

17. A system control server as recited in claim 1, the server comprising an interface to said computer network, a processor, working memory, and program memory storing server processor control code to receive said identifiers for said node unit and for said remote node unit, and to provide computer equipment connection data to respective computer equipment for each of said identified node unit and said identified remote node unit to enable connection between said respective computer equipment of said node units;

wherein said server is configured to store data linking said outgoing audio announce message to the node unit transmitting said audio announce message.

* * * * *